United States Patent
Hirashima et al.

(10) Patent No.: US 9,172,185 B2
(45) Date of Patent: Oct. 27, 2015

(54) CARD CONNECTOR FOR RECEIVING DIGITAL BROADCASTING AND ELECTRONIC APPARATUS

(71) Applicant: Kabushiki Kaisha Toshiba, Tokyo (JP)

(72) Inventors: Masaya Hirashima, Ome (JP);
Takahiro Sakaguchi, Ome (JP);
Tsuyoshi Kozai, Ome (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 0 days.

(21) Appl. No.: 14/458,061

(22) Filed: Aug. 12, 2014

(65) Prior Publication Data
US 2015/0180174 A1 Jun. 25, 2015

(30) Foreign Application Priority Data
Dec. 24, 2013 (JP) ................................. 2013-265241

(51) Int. Cl.
H01R 13/62 (2006.01)
H01R 13/639 (2006.01)
H01R 12/73 (2011.01)
H04N 21/418 (2011.01)

(52) U.S. Cl.
CPC .............. *H01R 13/639* (2013.01); *H01R 12/73* (2013.01); *H04N 21/4181* (2013.01)

(58) Field of Classification Search
CPC .......................... H01R 13/635; H01R 13/2442
USPC .......................... 439/159, 152–155, 160, 630
See application file for complete search history.

(56) References Cited

U.S. PATENT DOCUMENTS

| 6,595,803 | B2 | 7/2003 | Akagi et al. |
| 2006/0205258 | A1* | 9/2006 | Cho et al. ...................... 439/326 |
| 2008/0285218 | A1* | 11/2008 | Iijima ............................ 361/680 |
| 2009/0067811 | A1* | 3/2009 | Iwamoto ........................ 386/83 |
| 2009/0070971 | A1* | 3/2009 | Kamada et al. ................. 24/495 |
| 2011/0273825 | A1* | 11/2011 | Arata ........................ 361/679.01 |

FOREIGN PATENT DOCUMENTS

| JP | 2002-164121 | 6/2002 |
| JP | 2007-250488 | 9/2007 |

* cited by examiner

*Primary Examiner* — Phuongchi T Nguyen
(74) *Attorney, Agent, or Firm* — Rutan & Tucker LLP; William W. Schaal

(57) ABSTRACT

According to one embodiment, a card connector for receiving digital broadcasting includes a store portion into which a card for receiving digital broadcasting is inserted so as to be ejectable, and an ejection prevention mechanism configured to prevent the card stored in the store portion from being ejected. The card connector can automatically release the ejection prevention mechanism when the card is inserted into the store portion, and can automatically actuate the ejection prevention mechanism after the card is inserted into the store portion.

16 Claims, 5 Drawing Sheets

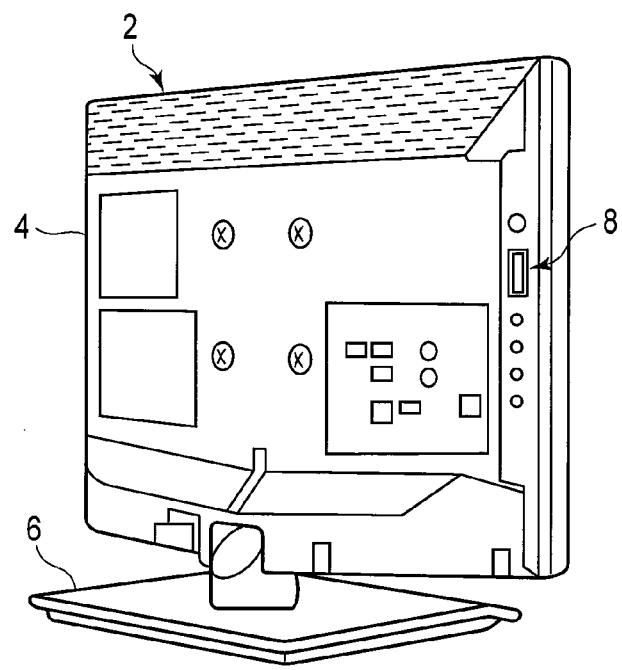
F I G. 1A
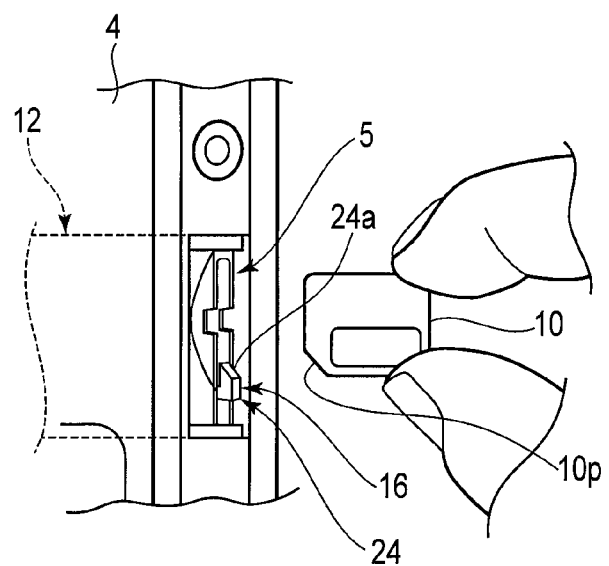
F I G. 1B

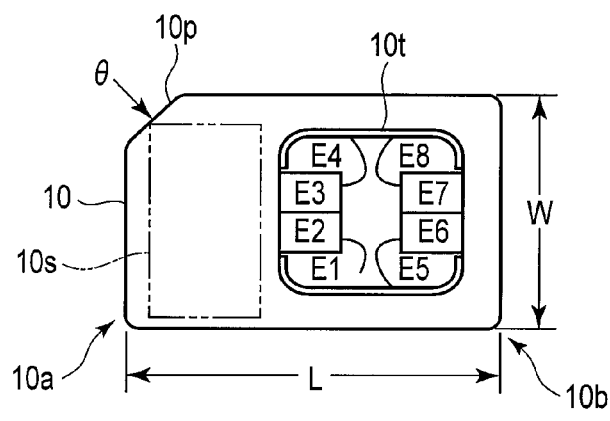
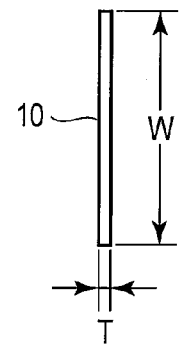
FIG. 2A
FIG. 2B
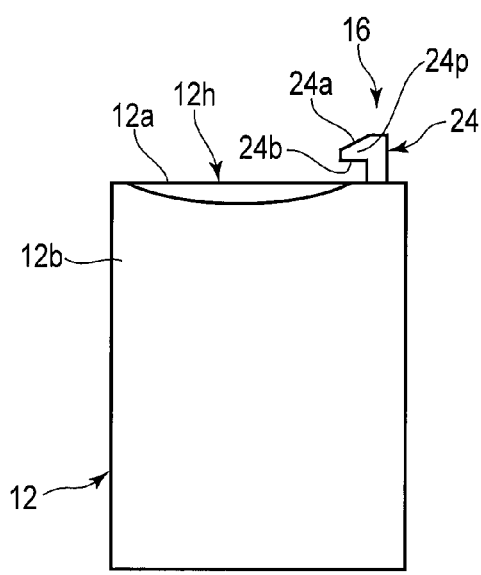
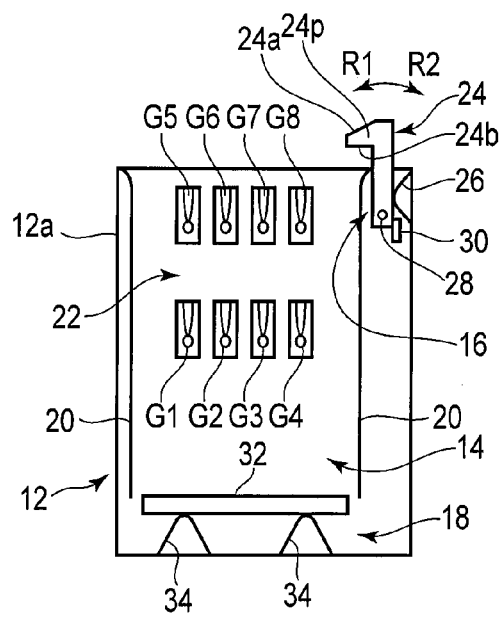
FIG. 3A
FIG. 3B

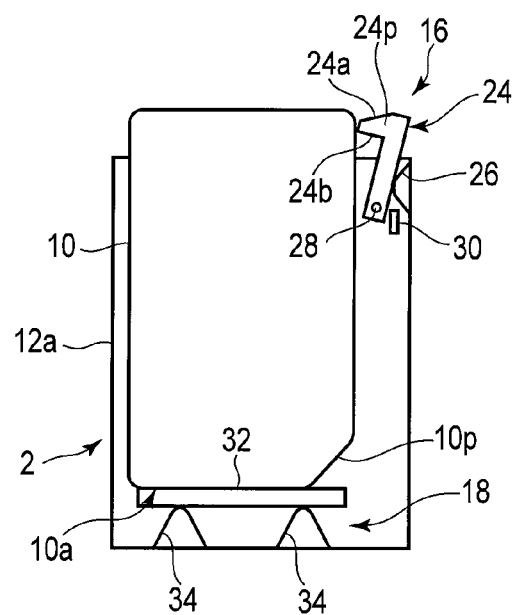
F I G. 6
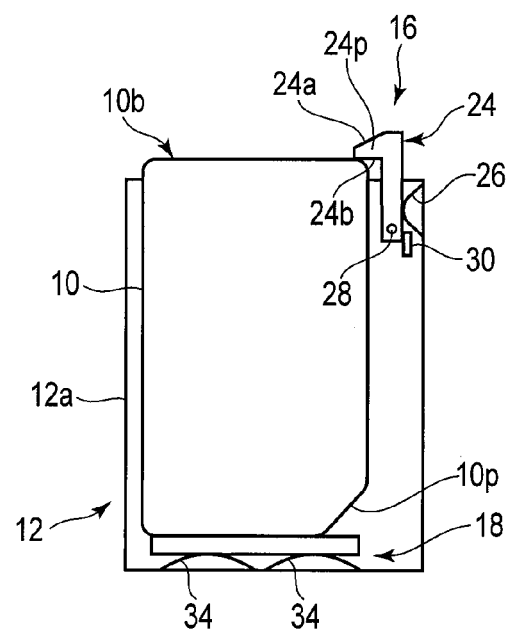
F I G. 7

CARD CONNECTOR FOR RECEIVING DIGITAL BROADCASTING AND ELECTRONIC APPARATUS

CROSS-REFERENCE TO RELATED APPLICATIONS

This application is based upon and claims the benefit of priority from Japanese Patent Application No. 2013-265241, filed Dec. 24, 2013, the entire contents of which are incorporated herein by reference.

FIELD

Embodiments described herein relate generally to a card connector for receiving digital broadcasting.

BACKGROUND

Electronic apparatuses such as televisions, tuners, set-top boxes, etc., for receiving various types of digital broadcasting such as digital satellite broadcasting, digital terrestrial television broadcasting, and 110 degrees east longitude CS digital broadcasting are known. Such an apparatus is equipped with a card connector which stores a card such as a BS Conditional Access Systems card (B-CAS card) to enable digital broadcasting to be received so as to limit recipients of video or audio digital data.

The card connector may be equipped with an ejection prevention mechanism which prevents the stored card for enabling digital broadcasting to be received from being ejected. According to a conventional eject prevention mechanism, ejection prevention must be released manually when the card is inserted and manually engaged again after the card has been inserted.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1A is an exemplary perspective view showing a television equipped with a card connector for receiving digital broadcasting of one embodiment as seen from the back side;

FIG. 1B is an exemplary perspective view showing a state of inserting an IC card into the card connector for receiving digital broadcasting of the embodiment;

FIG. 2A is an exemplary plan view showing an IC card applied to the embodiment as seen from a side of terminals;

FIG. 2B is an exemplary side view of the IC card applied to the embodiment;

FIG. 3A is an exemplary plan view showing the card connector for receiving digital broadcasting of the embodiment as seen from a side of a cover;

FIG. 3B is an exemplary plan view showing an inner structure constructed in a base in a state in which the cover is removed from the card connector for receiving digital broadcasting of the embodiment;

FIG. 6 is an exemplary plan view showing a state in which the IC card abuts on an eject mechanism in the embodiment;

FIG. 7 is an exemplary plan view showing a state in which ejection prevention is automatically actuated after the card is inserted in the embodiment;

DETAILED DESCRIPTION

Figure 4:
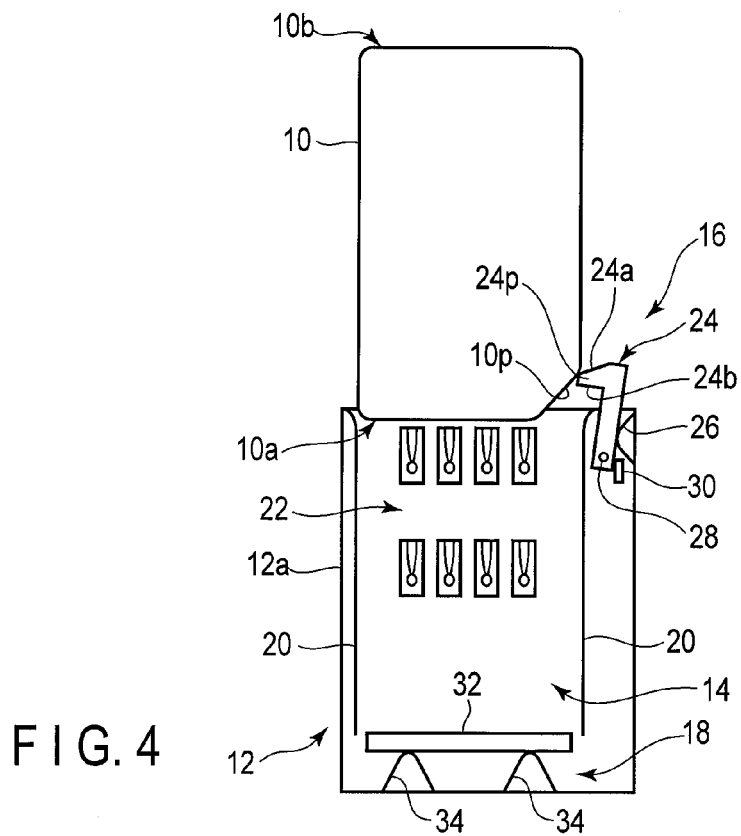
FIG. 4 is an exemplary plan view showing a state in which ejection prevention is automatically released when the card is inserted in the embodiment.

Various embodiments will be described hereinafter with reference to the accompanying drawings. In general, according to one embodiment, a card connector for receiving digital broadcasting comprises a store portion and an ejection prevention mechanism. A card for receiving digital broadcasting is inserted into the store portion so as to be ejectable. A front-end corner portion of the card is obliquely cut away and both sides between a front end and a rear end of the card extend straight and parallel to each other. The ejection prevention mechanism comprises an ejection prevention member configured to be displaced between a first position partly incorporating into a card insertion region of the store portion and a second position avoiding the card insertion region, an urging member configured to constantly urge the ejection prevention member toward the first position, and a receiving portion configured to receive a pressing force from the front-end corner portion of the card at the time of card insertion and to displace the ejection prevention member to the second position against an urging force of the urging member. When the card is inserted into the store portion, the card is prevented from being ejected from the store portion by displacing the ejection prevention member to the first position by the urging force of the urging member.

One of the embodiments will be described hereinafter with reference to the accompanying drawings.

In FIG. 1A and FIG. 1B, a television receiver 2 (hereinafter referred to as a TV) capable of receiving various types of digital broadcasting such as digital satellite broadcasting, digital terrestrial television broadcasting, and 110 degrees east longitude CS digital broadcasting is shown as an example of an electronic apparatus. The TV 2 comprises a housing 4 into which a display part (not shown) is incorporated, and a stand 6 which supports a housing 4.

As the display part, for example, a panel part which displays various images such as moving images and still images, for example, a liquid crystal display (LCD), a plasma display or an organic EL display is used. The housing 4 is formed of, for example, synthetic resin in a flat box shape. The stand 6 is provided to support a back side of the housing 4 and configured such that the orientation and height of the housing 4 can be adjusted. The orientation and height of the display part incorporated in the housing can be adjusted by supporting the housing 4 by the stand 6.

A card slot 8 is provided on one side of the housing 4. The card slot 8 is configured such that a card for receiving digital broadcasting to limit recipients of the digital broadcasting can be inserted into and ejected from the card slot 8. As the card for receiving digital broadcasting, an IC card such as a B-CAS card can be applied.

The B-CAS card 10 is developed and issued by BS Conditional Access Systems Co., Ltd., which was established by joint investment of digital broadcasting-related companies, and standardized as a unified standard in Japan. The same digital broadcasting can be received by the other TV by replacing the B-CAS card.

FIG. 2A and FIG. 2B shows the standard of the card 10 for receiving the digital broadcasting (hereinafter referred to as the card). A front-end corner portion 10*p* of the card 10 is obliquely cut away, both sides between a front end 10*a* and a rear end 10*b* extend straight and parallel to each other, and a side of the front end 10*a* and a side of the rear end 10*b* also extend straight and parallel to each other. A region 10*s* on which a specific identification number of the card 10 is printed and a card terminal portion 10*t* constituted by eight card terminals E1 to E8 are arranged on one surface of the card 10.

As the external form of the card 10, a thickness T of the card 10 is set to satisfy the relationship of 0.68 mm≤T≤0.84 mm. A width W of the front end 10*a* and the rear end 10*b* of the card 10 is set to satisfy the relationship of 14.9 mm≤W≤15.1 mm. A length L from the front end 10*a* to the read end 10*b* of the card 10 is set to satisfy the relationship of 24.9 mm≤L≤25.1 mm.

Furthermore, an inclination angle θ of the front corner portion 10*p* of the card 10 is set to satisfy the relationship of 43°≤θ≤47°. More specifically, the front corner portion 10*p* of the card 10 is subjected to C chamfering. Detail of the C chamfering angle θ is set to satisfy the relationship of 3±0.1×45°±2°.

FIG. 3A and FIG. 3B show a card connector 12 for receiving digital broadcasting (hereinafter referred to as the card connector) according to the present embodiment. The card connector 12 comprises a base 12*a* mounted on a print substrate (not shown) and a cover 12*b* attached to cover the base 12*a*. A card insertion and ejection opening 12*h* surrounded by the base 12*a* and the cover 12*b* is provided on one side of the card connector 12.

In the housing 4 of the TV 2, the card connector 12 is arranged such that the card insertion and ejection opening 12*h* is opposed to the card slot 8 (see FIG. 1A and FIG. 1B). The card 10 can be inserted into the card connector 12 through the card insertion and ejection opening 12*h* so as to be ejectable by putting the card 10 in the card slot 8.

The card connector 12 comprises a store portion 14 into which the card 10 is inserted so as to be ejectable, an ejection prevention mechanism 16 which prevents the card 10 stored in the store portion 14 from being ejected, and an eject mechanism 18 which pushes the card 10 inserted into the store portion 14 in the ejecting direction.

A pair of guide portions 20 extending parallel to each other along the direction of insertion and ejection of the card 10, and a connector terminal portion 22 constituted by eight connector terminals G1 to G8 are provided in the store portion 14.

The pair of guide portions 20 guides the card 10 inserted from the card insertion and ejection opening 12*h* into the store portion 14 at the time of insertion, and guides the card 10 from the store portion 14 to the card insertion and ejection opening 12*h* at the time of ejection.

In the connector terminal portion 22, the eight connector terminals G1 to G8 are arranged to touch the eight card terminals E1 to E8 of the card 10, respectively, when the card 10 is stored in the store portion 14. Each of the connector terminals G1 to G8 is structured in a posture of rising from the base 12*a*, and resiliently touches each of the card terminals E1 to E8.

Figure 5:
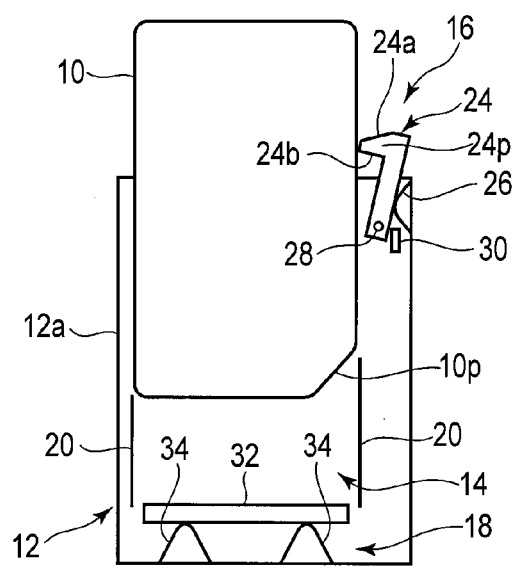
FIG. 5 is an exemplary plan view showing a state of inserting the card in the embodiment.
Figure 8:
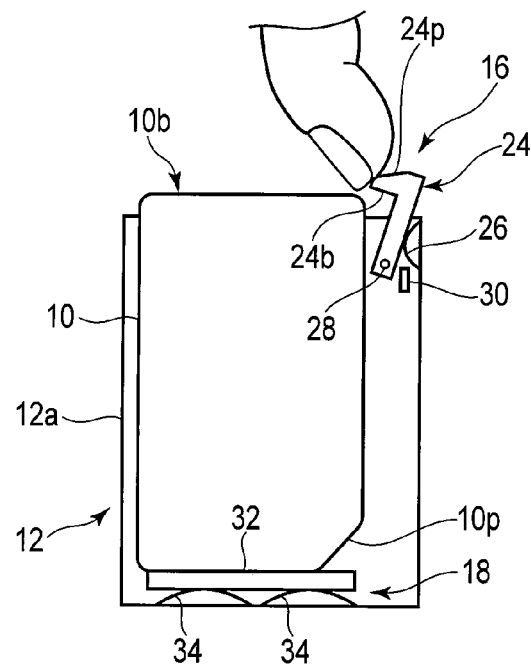
FIG. 8 is an exemplary plan view showing a state in which ejection prevention is released by hand when the card is ejected in the embodiment.

The ejection prevention mechanism 16 is arranged adjacent to the card insertion and ejection opening 12*h*, and comprises an ejection prevention member 24 which can be displaced between a first position (see FIG. 3B) partly incorporated in the card insertion region of the store portion 14 and a second position (see FIG. 5 and FIG. 6) avoiding the card insertion region, and an urging member 26 which constantly urges the ejection prevention member 24 toward the first position.

As the urging member 26, for example, a compression coil springy, a leaf spring, etc., can be used. The leaf spring is shown in the drawings as an example of the urging member 26. The leaf spring 26 has a structure totally having elasticity since one end of the leaf spring 26 is fixed to the base 12*a*, the other end is a free end, and a middle portion between both ends is curved convexly toward the ejection prevention member 24.

In the present embodiment, the ejection prevention member 24 is arranged in a position avoiding the store portion 14, and configured to be rotatable about a rotation axis 28 in the directions of arrows R1 and R2. That is, a base end side of the ejection prevention member 24 is rotatably attached to the base 12*a* via the rotation axis 28, and a convex piece 24*p* projecting toward the store portion 14 is provided on a front end side of the ejection prevention member 24.

The urging member 26 is arranged in a position closer to the front end side of the ejection prevention member 24 than the rotation axis 28 such that the ejection prevention member 24 is sandwiched between the store portion 14 and the urging member 26. An urging force of the urging member 26 acts as a force which rotates the ejection prevention member 24 about the rotation axis 28 in the direction of arrow R1.

A stopper 30 fixed to the base 12*a* is provided in a position closer to the base end side of the ejection prevention member 24 than the rotation axis 28. The stopper 30 is arranged with a positional relationship of being aligned with the urging member 26 such that the ejection prevention member 24 is sandwiched between the store portion 14 and the stopper 30.

More specifically, the urging member 26 and the stopper 30 align along the direction of insertion and ejection of the card 10 in a region on the opposite side of the store portion 14 across the ejection prevention member 24, and are arranged on both sides of the rotation axis 28, respectively.

The force which rotates the ejection prevention member 24 in the direction of arrow R1 by the urging force of the urging member is thereby received by the stopper 30. As a result of this, the ejection prevention member 24 is positioned in the first position (see FIG. 3B) in a state in which the convex piece 24*p* is maintained in a posture of partly incorporating into the card insertion region.

A receiving portion 24*a* which receives the pressing force from the front-end corner portion 10*p* of the card 10 (see FIG. 4) at the time of card insertion and causes the ejection prevention member 24 to be displaced toward the second position (see FIG. 5 and FIG. 6) against the urging force of the urging member 26 is provided in the convex piece 24*p* of the ejection prevention member 24.

The receiving portion 24*a* has a gradient along the direction of inclination of the front-end corner portion 10*p* of the card 10. The gradient of the receiving portion 24*a* is preferably set to conform or correspond to the inclination angle θ "43°≤θ≤47°" of the front-end corner portion 10*p* of the card 10. For example, the gradient of the receiving portion 24*a* may be set to 43° if the inclination angle θ of the front-end corner portion 10*p* is 43°, and the gradient of the receiving portion 24*a* may be set to 47° if the inclination angle θ of the front-end corner portion 10*p* is 47°.

The receiving portion 24*a* can thereby abut on the front-end corner portion 10*p* without forming any clearance when the card 10 is inserted. The pressing force from the front-end corner portion 10*p* at the time of card insertion can be thoroughly transferred to the receiving portion 24*a*. As a result of this, the ejection prevention member 24 can be rotated in the direction of arrow R2 while resisting the urging force of the urging member 26, and displaced smoothly to the second position (see FIG. 5 and FIG. 6).

Furthermore, a locking portion 24b which partly locks the rear end 10b of the card 10 in a state in which the card 10 is stored in the store portion 14 after card insertion is provided in the ejection prevention member 24 (see FIG. 7). The locking portion 24b partly locks the rear end 10b of the card 10 when the ejection prevention member 24 is displaced to the first position (see FIG. 3B) by insertion of the card 10 into the store portion 14.

More specifically, the locking portion 24b is provided in the convex piece 24p of the ejection prevention member 24. A structure of the locking portion 24b is preferably set to have a shape orthogonal to the ejecting direction of the card 10 and parallel to the rear end 10b of the card 10 (see FIG. 7) in a state in which the ejection prevention member 24 is positioned in the first position (see FIG. 3B).

The locking portion 24b can thereby abut on the rear end 10b of the card 10 stored in the store portion 14 without forming any clearance after the card insertion.

Furthermore, an eject mechanism 18 which presses the card 10 inserted into the store portion 14 in the ejecting direction is provided in the card connector 12 of the present embodiment. The eject mechanism 18 comprises an abutting portion 32 on which the front end 10a of the card 10 stored in the store portion abuts, and a pressing member 34 which presses the abutting portion 32 in the direction of ejecting the card 10.

The abutting portion 32 is provided in a position opposite to the front end 10a of the card 10 in a state in which the card 10 is stored in the store portion 14.

As the pressing member 34, for example, a compression coil spring, a leaf spring, etc., can be used. A pair of leaf springs is shown in the drawings as an example of the pressing member 34. Each of the leaf springs 34 is configured to be entirely elastic by comprising one end fixed to the base 12a, the other end as a free end, and a middle portion between both ends curved convexly toward the abutting portion 32.

The abutting portion 32 is arranged across the convex curved portions of the pair of pressing members 34, and coupled to each of the convex curved portions by means of, for example, adhesion, welding, etc. As a result, the abutting portion 32 is supported by the pair of pressing members 34, and is configured to be movable along the direction of insertion and ejection of the card 10 by elastic deformation of the pressing members 34.

Next, operations of the card connector 12 of the present embodiment will be described.

The card 10 is inserted into the card slot 8 from the side of the frond end 10a while directing the front-end corner portion 10p downwardly (see FIG. 1B). When the front end 10a of the card 10 reaches the card insertion and ejection opening 12h of the card connector 12, the front-end corner portion 10p abuts on the receiving portion 24a of the ejection prevention member 24 positioned in the first position (see FIG. 3B). If the card 10 is inserted in this state, the pressing force is transferred from the front-end corner portion 10p to the receiving portion 24a.

At this time, the receiving portion 24a relatively moves along the front-end corner portion 10p, and the ejection prevention member 24 thereby rotates against the urging force of the urging member 26 (see FIG. 4). If the card 10 is further inserted, the receiving portion 24a climbs over the front-end corner portion 10p and the ejection prevention member 24 is thereby moved to the second position (see FIG. 5).

Then, the card 10 is guided along the pair of guide portions 20 and the front end 10a abuts on the abutting portion 32 (see FIG. 6). Here, if the card 10 is inserted against the pressing force of the pair of pressing members 34, the rear end 10b of the card 10 approaches the convex piece 24p.

After this, when the card 10 is inserted into the store portion 14, the convex piece 24p rotates behind the rear end 10b of the card 10 and the urging force of the urging member 26 is released. At this time, the ejection prevention member 24 rotates by the urging force (i.e., restoring force) of the urging member 26. When the ejection prevention member 24 is displaced to the first position by this rotation, the locking portion 24b abuts on the rear end 10b of the card 10 to partly lock the rear end 10b (see FIG. 7).

The card 10 stored in the store portion 14 is maintained in a state of being sandwiched between the abutting portion 32 and the locking portion 24b by the pressing force (i.e., restoring force) of the pair of pressing members 34, and prevented from being ejected. The card 10 is thereby prevented from being ejected from the store portion 14.

When the card 10 is ejected from the store portion 14, a part of the convex piece 24p of the ejection prevention member 24 in the first position is hooked by a finger, and the ejection prevention member 24 rotates to the second position against the urging force of the urging member 26.

The locked state of the locking portion 24b of the convex piece 24p and the rear end 10b of the card 10 is thereby released, and the pressing force (restoring force) of the pair of pressing members 34 is transmitted to the card 10 through the abutting portion 32. At this time, the rear end 10b of the card 10 is ejected from the store portion 14 in accordance with the restoration amount of the pressing members 34. As a result, the card 10 can be ejected from the card slot 8.

As described above, the card connector 12 of the present embodiment can automatically release the ejection prevention mechanism 16 when the card 10 is inserted into the store portion 14, and can automatically actuate the ejection prevention mechanism 16 after the card 10 is inserted into the store portion 14. In this case, since the ejection prevention mechanism 16 does not need to be released by hand at the time of card insertion, the usability (convenience) of the card connector 12 can be dramatically increased.

Furthermore, according to the card connector 12 of the present embodiment, the card 10 can be inserted into, stored in, and ejected from the store portion 14 by just comprising the ejection prevention mechanism 16 having a simple structure. In this case, since a mechanism having a complicated structure such as a push-lock/push-eject mechanism does not need to be incorporated into the card connector 12, the number of components is reduced and, accordingly, manufacturing costs of the card connector 12 can be significantly reduced.

It should be noted that the above-described embodiment has been presented as an example, and is not intended to limit the scope of the inventions.

In the above-described embodiment, the ejection prevention mechanism 16 which displaces the ejection prevention member 24 to the first position and the second position by rotating the ejection prevention member 24 is assumed. However, an ejection prevention mechanism 36 which displaces the ejection prevention member 24 to the first position and the second position by translating (sliding) the ejection prevention member 24 may be applied instead of the ejection prevention mechanism 16.

Figure 9:
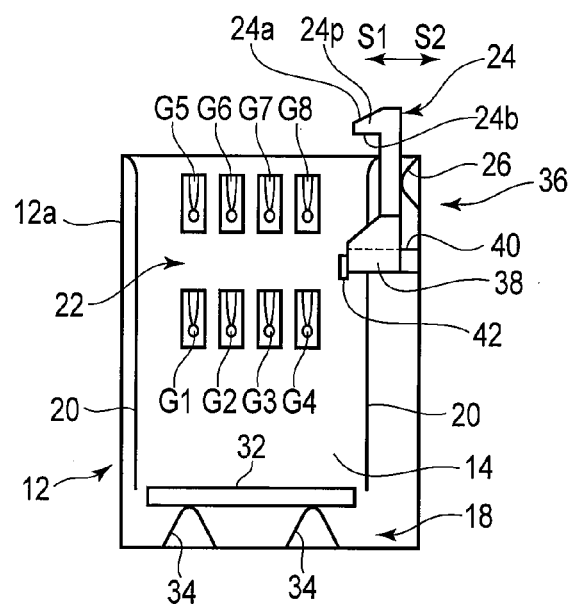
FIG. 9 is an exemplary plan view showing an inner structure of a card connector for receiving digital broadcasting in a modified embodiment.

FIG. 9 shows a structure of the card connector 12 comprising the ejection prevention mechanism 36 of the modified embodiment. In the ejection prevention mechanism 36, the base end side of the ejection prevention member 24 is fixed to a slider 38. The slider 38 is configured to move in the directions of arrows S1 and S2 along a guide 40 provided in the base 12a. The guide 40 extends along the direction intersecting the insertion and ejection direction of the card 10. A stopper 42 fixed to the base 12a is provided at an extending end of the guide 40 to define a moving range of the slider 38.

As the structure of the slider 38 and the guide 40, for example, a structure of moving the slider 38 along the guide 40 by forming the guide 40 in a convex shape and by forming in the slider 38 a concave groove (not shown) into which the convex guide 40 is fit, or a structure of moving the slider 38 along the guide 40 by forming the guide 40 in a concave shape and by forming in the slider 38 a convex groove (not shown) which is fit into the concave guide 40 can be applied.

Furthermore, the urging member 26 is provided such that the ejection prevention member 24 is sandwiched between the store portion 14 and the urging member 26. The urging force of the urging member 26 constantly acts on the ejection prevention member 24. The slider 38 is thereby moved along the guide 40 in the direction of arrow S1 and maintained in a posture of being pressed against the stopper 42. In this state, the ejection prevention member 24 is positioned in the first position in a state in which the convex piece 24p is maintained in a posture of partly incorporating into the card insertion region.

Since the other structure is the same as the above-described embodiment, the description thereof is omitted.

As described above, according to the present modified embodiment, when the pressing force from the front-end corner portion 10p of the card 10 acts on the receiving portion 24a at the time of card insertion, the slider 38 is moved along the guide 40 in the direction of arrow S2 and the ejection prevention member 24 is thereby displaced from the first position to the second position. The card can be thereby inserted into the store portion 14.

When the card 10 is inserted into the store portion 14, the convex piece 24p is moved behind the rear end 10b of the card 10 and the urging force of the urging member 26 is released. At this time, the slider 38 is moved along the guide 40 by the urging force (i.e., restoring force) of the urging member 26 and pressed against the stopper 42, and the ejection prevention member 24 is displaced from the second position to the first position. The card 10 is thereby maintained in a state of being prevented from being ejected by the locking portion 24b.

Since the other operations and the advantage of the present modified embodiment are the same as those of the above-described embodiment, the descriptions thereof are omitted.

In addition, although the TV 2 is assumed as an electronic apparatus comprising the card connector 12 in the embodiment and the modified embodiment, the electronic apparatus is not limited to this. For example, the card connector 12 can be used in an electronic apparatus such as a personal computer, a camera, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A digital broadcasting card connector for receiving in a television receiver, comprising:
    a store portion into which a card for receiving digital broadcasting is inserted so as to be ejectable, a front-end corner portion of the card being obliquely cut away, both sides between a front end and a rear end of the card extending straight and parallel to each other; and
    an ejection prevention mechanism configured to prevent the card stored in the store portion from being ejected, the ejection prevention mechanism comprising:
        an ejection prevention member configured to be displaced between a first position partly incorporating into a card insertion region of the store portion and a second position avoiding the card insertion region;
        an urging member configured to constantly urge the ejection prevention member toward the first position; and
        a receiving portion provided in the ejection prevention member and configured to receive a pressing force from the front-end corner portion of the card at the time of card insertion and to displace the ejection prevention member to the second position against an urging force of the urging member,
    the card being prevented from being ejected from the store portion by displacing the ejection prevention member to the first position by the urging force of the urging member when the card is inserted into the store portion.

2. The card connector of claim 1, wherein in the card, relations of $$0.68 \text{ mm} \leq T \leq 0.84 \text{ mm},$$

$$14.9 \text{ mm} \leq W \leq 15.1 \text{ mm},$$

$$24.9 \text{ mm} \leq L \leq 25.1 \text{ mm, and}$$

$$43° \leq \theta \leq 47°$$

are satisfied;
    where a thickness is T, a width of the front end or the rear end is W, a length from the front end to the rear end is L, and an inclination angle of the front-end corner portion is $\theta$.

3. The card connector of claim 1, wherein the receiving portion of the ejection prevention member has a gradient along a direction of inclination of the front-end corner portion of the card.

4. The card connector of claim 1, wherein the ejection prevention mechanism displaces the ejection prevention member to the first position and the second position by rotating the ejection prevention member.

5. The card connector of claim 1, wherein the ejection prevention mechanism displaces the ejection prevention member to the first position and the second position by moving the ejection prevention member parallel.

6. The card connector of claim 1, further comprising an eject mechanism configured to press the card inserted into the store portion in an ejecting direction,
    wherein the eject mechanism comprises:
        an abutting portion on which the front end of the card inserted into the store portion abuts; and
        a pressing member configured to press the abutting portion to the direction of ejecting the card.

7. The card connector of claim 6, wherein
a locking portion configured to partly lock the rear end of the card when the ejection prevention member is displaced to the first position by card insertion into the store portion is provided in the ejection prevention member, and
the card inserted into the store portion is maintained in a state of being sandwiched between the abutting portion and the locking portion by the pressing force of the pressing member.

8. The card connector of claim 7, wherein the locking portion of the ejection prevention member is shaped to be orthogonal to the ejecting direction of the card and parallel to the rear end of the card.

9. A digital broadcasting electronic apparatus for receiving in a television receiver comprising:
a housing; and
a digital broadcasting card connector arranged in the housing,
the card connector comprising:
a store portion into which a digital broadcasting card for receiving digital broadcasting is inserted so as to be ejectable, a front-end corner portion of the card being obiquely cut away, both sides between a front end and a rear end of the card being extend straight and parallel to each other; and
an ejection prevention mechanism configured to prevent the card stored in the store portion from being ejected, the ejection prevention mechanism comprising:
an ejection prevention member configured to be displaced between a first portion partly incorporating into a card insertion region of the store portion and a second position avoiding the card insertion region;
an urging member configured to constantly urge the ejection prevention member toward the first position; and
a receiving portion provided in the ejection prevention member and configured to receive a pressing force from the front-end corner portion of the card at the time of card insertion and to displace the ejection prevention member toward the second position against an urging force of the urging member,
the card being prevented from being ejected from the store portion by displacing the ejection prevention member to the first position by the urging force of the urging member when the card is inserted into the store portion.

10. The apparatus of claim 9, wherein in the card, relations of $0.68\ mm \leq T \leq 0.84\ mm$, $14.9\ mm \leq W \leq 15.1\ mm$, $24.9\ mm \leq L \leq 25.1\ mm$, and $43° \leq \theta \leq 47°$ are satisfied;
where a thickness is T, a width of the front end or the rear end is W, a length from the front end to the rear end is L, and an inclination angle of the front-end corner portion is θ.

11. The apparatus of claim 9, wherein the receiving portion of the ejection prevention member has a gradient along a direction of inclination of the front-end corner portion of the card.

12. The apparatus of claim 9, wherein the ejection prevention mechanism displaces the ejection prevention member to the first position and the second position by rotating the ejection prevention member.

13. The apparatus of claim 9, wherein the ejection prevention mechanism displaces the ejection prevention member to the first position and the second position by moving the ejection prevention member parallel.

14. The apparatus of claim 9, further comprising an eject mechanism configured to press the card inserted into the store portion in an ejecting direction,
wherein the eject mechanism comprises
an abutting portion on which the front end of the card inserted into the store portion abuts, and
a pressing member configured to press the abutting portion to the direction of ejecting the card.

15. The apparatus of claim 14, wherein
a locking portion configured to partly lock the rear end of the card when the ejection prevention member is displaced to the first position by card insertion into the store portion is provided in the ejection prevention member, and
the card inserted into the store portion is maintained in a state of being sandwiched between the abutting portion and the locking portion by the pressing force of the pressing member.

16. The apparatus of claim 15, wherein the locking portion of the ejection prevention member is shaped to be orthogonal to the ejecting direction of the card and parallel to the rear end of the card.

* * * * *